United States Patent [19]

Lam et al.

[11] Patent Number: 5,706,036

[45] Date of Patent: Jan. 6, 1998

[54] METHOD AND APPARATUS FOR PROVIDING A VIDEO SYNCHRONISING SIGNAL OF A PREDETERMINED POLARITY

[75] Inventors: Kah Hong Paul Lam; Luen Hin Kwok; Chi Ming Lai, all of Hong Kong, Hong Kong

[73] Assignee: Motorola, Inc., Schaumburg, Ill.

[21] Appl. No.: 326,894

[22] Filed: Oct. 21, 1994

[51] Int. Cl.$^6$ .................................... G09G 5/00
[52] U.S. Cl. ..................... 345/213; 348/547; 348/558
[58] Field of Search ........................ 345/213, 211, 345/212, 214; 348/547, 548, 525, 526, 527, 529, 558, 500; 377/20; 370/94.1

[56] References Cited

U.S. PATENT DOCUMENTS 5,394,171  2/1995  Rabii ..................................... 345/213

*Primary Examiner*—Andrew Faile
*Assistant Examiner*—Andrew B. Christensen
*Attorney, Agent, or Firm*—Robert D. Atkins

[57] ABSTRACT

A circuit 100 for determining the polarity of an input sequence of pulses 200 or 300 applied to input 102 by digitally determining the polarity of a predetermined number of pulses of the input sequence of pulses using the digital polarity determinator 130 and, dependent on the output of the digital polarity determinator 130, routing the input sequence of pulses by the polarity switch 120 to the output 135 when the polarity of the input sequence of pulses is a predetermined polarity, and routing the input sequence of pulses to the output 135 via the inverter 125 when the polarity of the input sequence of pulses is not the predetermined polarity, thereby providing an output sequence of pulses having only the predetermined polarity.

6 Claims, 3 Drawing Sheets

METHOD AND APPARATUS FOR PROVIDING A VIDEO SYNCHRONISING SIGNAL OF A PREDETERMINED POLARITY

FIELD OF THE INVENTION

This invention relates in general to video synchronising signals, and in particular to a method and apparatus for controlling the polarity of a video synchronising signal.

BACKGROUND OF THE INVENTION

Video monitors are well known in the art. Conventionally, a video monitor is coupled to equipment such as a computer which provides a variety of signals to the video monitor in order to obtain a display on the screen of the video monitor. One of these signals is a video composite synchronising signal (VCSS). The polarity of the VCSS provided to a video monitor varies with the equipment that provide the VCSS, likewise the polarity of VCSS required by a video monitor may vary. This variation of the polarity of the VCSS of the equipment and the video monitor may be dependent upon such factors as the nationality, and the design considerations, adopted by various manufacturers of both the equipment and the video monitor. Hence, when providing a VCSS to a video monitor it is important to ensure that the polarity of the VCSS matches the polarity required by the video monitor in order to obtain a proper display on the video monitor, and to avoid possible equipment damage.

Ensuring the correct VCSS polarity when coupling equipment to a video monitor introduces significant difficulties to users. One method of overcoming these difficulties in a video monitor is to provide a selectable VCSS polarity switch enabling a user to select the VCSS polarity when installing the video monitor. However, this method is only useful to professional users familiar with the necessary steps required to select the polarity of the VCSS in a video monitor. A growing market of video monitors are home computer users, and a significant disadvantage of this method for such users, is the need for additional steps when installing a video monitor which complicates the installation of the video monitor.

Another method of automatically providing a correct VCSS polarity when coupling equipment to a video monitor has been developed. This method incorporates an analogue circuit in the video monitor which averages the VCSS provided to a video monitor over a duration of time, compares the average to a predetermined value, and dependent on whether the average is greater or less than the predetermined value, provides an indication of the polarity of the VCSS. Similar to manually switching the VCSS polarity switch as described in the method above, the indication is utilised to switch the VCSS either directly to other video monitor circuitry when the polarity of the VCSS is the predetermined polarity or, via an inverter to the other video monitor circuitry when the polarity of the VCSS is not the predetermined polarity. This method provides a definite advantage over the one described above, however, the analogue circuit, conventionally utilising bipolar devices, suffers several disadvantages. A disadvantage inherent in the use of bipolar devices is high power consumption and the susceptibility of variation in performance of these devices due to variation in operational conditions. In addition, as video monitors use digital control circuitry, yet another disadvantage of this method is the need for interfacing the analogue circuit with the digital control circuit.

Hence, a need exists for a user friendly method for installing a video monitor which provides a VCSS of a predetermined polarity to the video monitor that preferably does not utilise bipolar devices.

SUMMARY OF THE INVENTION

In carrying out the objects of the present invention in one form, there is provided a method for determining the polarity of a video composite synchronising signal (VCSS), and utilising this determination to process the VCSS to provide a VCSS of a predetermined polarity to a video monitor.

In carrying out the objects of the present invention in another form, there is provided an apparatus comprising a digital polarity determinator that receives an input signal and provides an output signal indicating the polarity of the input signal, and a polarity switch that routes the input signal to an output when the digital polarity determinator indicates the input signal is a predetermined polarity, and routes the input signal to the output via an inverter when the input signal is not the predetermined polarity.

DETAILED DESCRIPTION OF THE INVENTION

Figure 1:
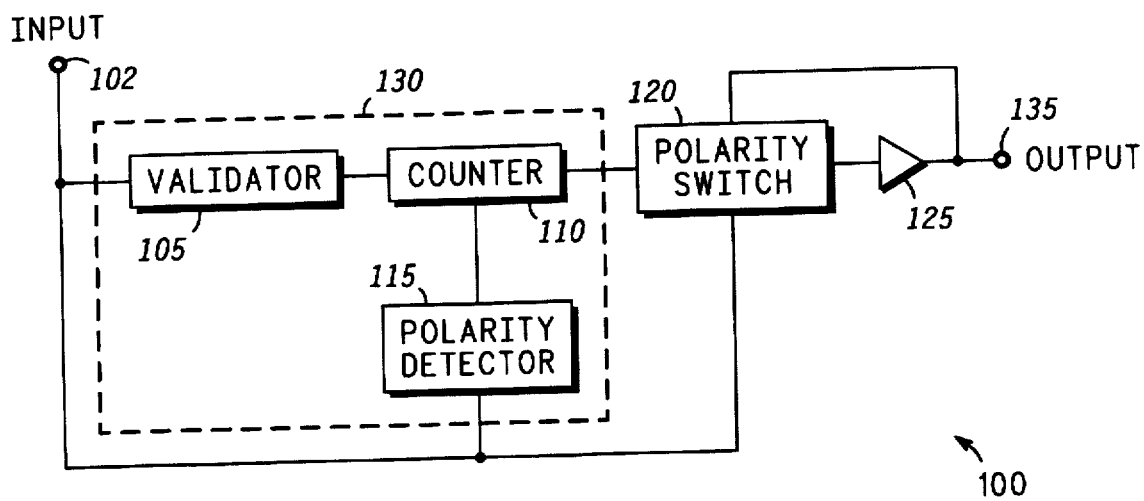
FIG. 1 illustrates a functional block diagram of a circuit in accordance with a preferred embodiment of the present invention.

FIG. 1 illustrates a functional block diagram of a circuit 100 comprising an input 102, a digital polarity determinator 130, a polarity switch 120, an inverter 125, and an output 135. The digital polarity determinator 130 determines the polarity of an input signal applied to the input 102, and provides an output signal that indicates the polarity of the input signal to the polarity switch 120. Conventionally, the input signal is a sequence of pulses having at least a first and second polarity, where, for example, the first and second polarity comprises a first and second level of the input signal, and where the first polarity may be positive relative to the second polarity or, alternatively, where the first polarity may be negative relative to the second polarity.

The digital polarity determinator 130 comprises a validator 105, a counter 110 and a polarity detector 115. The validator 105 determines whether a sequence of pulses applied to the input 102 is valid. For example, the validator 105 may determine whether each pulse of the input sequence of pulses complies with a predetermined criteria. For example, when the pulse width of a pulse of the input sequence of pulses meets a minimum pulse width criteria, for example 8 microseconds, the validator 105 provides an output pulse to the counter 110. The validator 105 may comprise digital electronic logic circuits that may include, for example, a counter and an edge detector such as are well known in the art.

The polarity detector 115 receives an input sequence of pulses, determines whether the polarity of sequential pulses of the input sequence of pulses are substantially similar and provides an output signal indicating the polarity of the sequential pulses is substantially similar. However, when two sequential pulses have different polarities, the output signal of the polarity detector 115 indicates the polarity of the two sequential pulses is not substantially similar. The polarity detector 115 may comprise digital logic circuits that may include a latch and an edge detector, such as are well known in the art.

The counter 110 counts each pulse received from the validator 105. When the counter 110 counts to a predetermined number, the counter 110 provides an output signal to the polarity switch 120. When the counter 110 receives an output signal from the polarity detector 115, indicating the polarity of two sequential pulses is not substantially similar while counting to a predetermined number, the counter 110 resets, conventionally to zero. Subsequently, the counter 110, begins counting each pulse received from the validator 105. The counter 110 may comprise digital logic circuits that may include a counter and a latch, such as are well known in the art.

Hence, the predetermined number of pulses required to trigger an output from the counter advantageously sets a duration during which the polarity of the input sequence of pulses must remain consistent before any changes to the polarity of the input sequence of pulses may be initiated. This ensures that spurious changes having a duration that is less than a predetermined duration does not cause erroneous changes in the polarity of the input sequence of pulses. In addition, by judicious selection of the predetermined number of pulses, vertical synchronising pulses which conventionally comprise a momentary inversion of a predetermined number of pulses of the input sequence of pulses, will not be construed by the digital polarity determinator as a change of polarity of the input sequence of pulses. Hence, the occurrence of vertical synchronising pulses will be prevented from affecting the operation of the digital polarity determinator.

The polarity switch 120 has two inputs, an input to which a signal is applied via input 102 and a control input coupled to the output of the digital polarity determinator 130, and two outputs to which the applied input signal may be coupled dependent upon the output signal of the digital polarity determinator 130. For example, the polarity switch 120 may couple a signal applied to the input 102 to the input of the inverter 125 when the output signal of the digital polarity determinator indicates a first polarity, alternatively, the polarity switch 120 may couple the input signal directly to the output 135 when the output signal of the digital polarity determinator indicates a second polarity. The inverter 125 simply inverts a signal applied to its input and provides the inverted signal to the output 135, thereby modifying the polarity of a signal from a first polarity to a second polarity. The combination of the polarity switch 120 and the inverter 125 may comprise digital logic circuits that may include an exclusive OR gate, such as is well known in the art.

Figure 2:
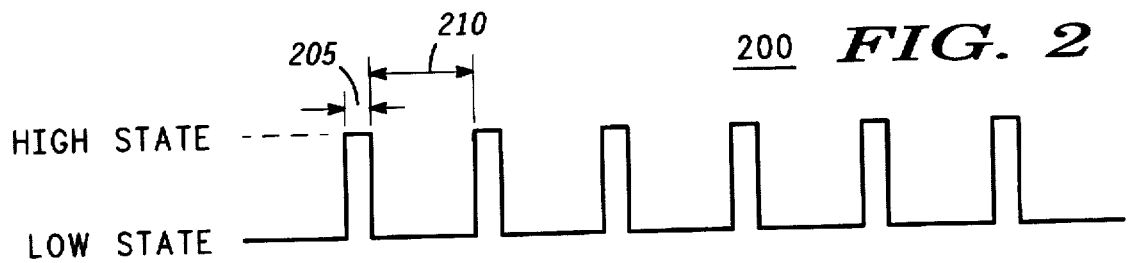
FIGS. 2, 3 and 4 illustrate input and output waveforms of the circuit in FIG. 1 in accordance with the preferred embodiment of the present invention.

FIG. 2 illustrates an input waveform 200 that may be applied to the input 102 comprising a sequence of pulses having a high state and a low state. The input waveform 200 may be defined as having a positive polarity where the duration each pulse of the waveform 200 is in the low state 210 is greater than the duration each pulse is in the high state 205. The high and low states may, for example, represent voltage levels or current levels in an electronic circuit.

Figure 3:
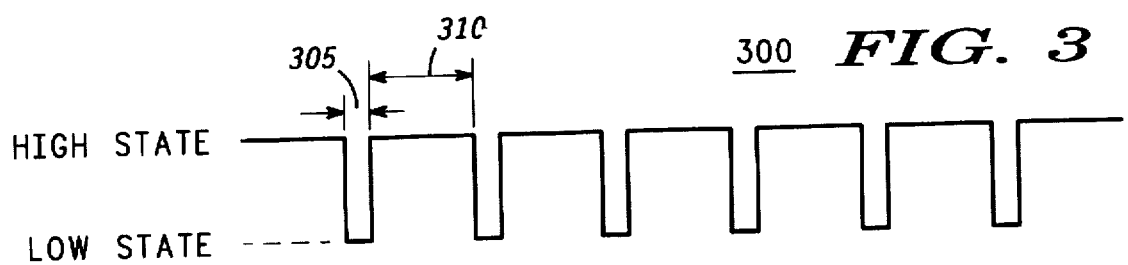

Similarly, FIG. 3 illustrates another input waveform 300 that may be applied to the input 102 comprising a sequence of pulses having a high state and a low state. The input waveform 300 may be defined as having a negative polarity where the duration each pulse of the waveform 300 is in the high state 310 is greater than the duration each pulse is in the low state 305. The high and low states of the waveform 300 may, for example, represent voltage levels or current levels in an electronic circuit.

Figure 4:
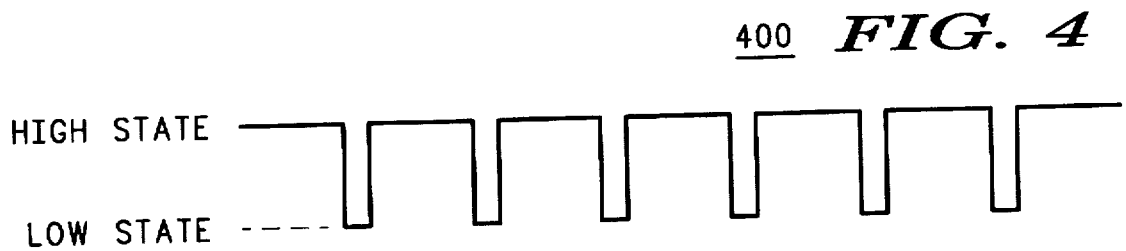

FIG. 4 illustrates an output waveform 400 comprising a sequence of pulses having a high state and low state. The output waveform 400 represents the signal from the output 135 having a predetermined polarity. And similar to the waveforms 200 and 300, the high and low states may represent voltage levels or current levels in an electronic circuit.

Figure 5:
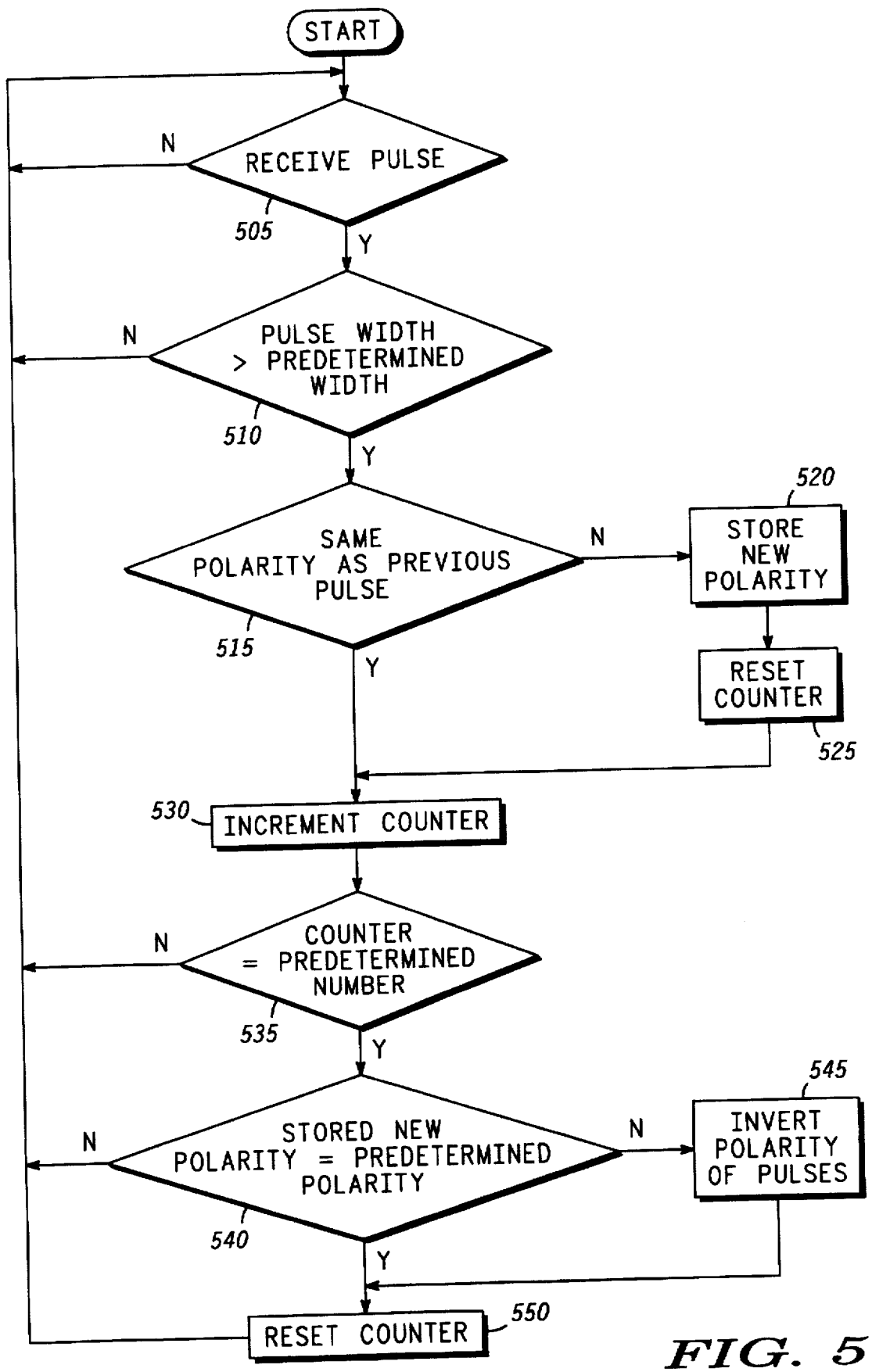
FIG. 5 illustrates a flowchart detailing the operation of the circuit in FIG. 1 in accordance with the preferred embodiment of the present invention.

FIG. 5 illustrates a flowchart detailing operation of the circuit 100 where, the validator 105, determines whether an input pulse, such as in input waveform 200 or 300, has been received 505, and further determines whether the pulse width of the input pulse is greater 510 than a predetermined pulse width. When the pulse width is less than the predetermined pulse width, the process returns to awaiting receipt 505 of another input pulse, however, when the pulse width is greater than the predetermined pulse width, the validator 105 provides an output pulse to the counter 110.

The polarity detector 115 also receives the input pulse, such as in input waveform 200 or 300, from the input 102, and upon determining the polarity of the input pulse is substantially similar 515 to the polarity of a previous pulse, such as in input waveform 200 or 300, the polarity detector 115 causes the counter 110 to increment one count. However, when the polarity of the input pulse is not substantially similar 515 to the polarity of a previous pulse, the polarity of the input pulse is stored 520 as a new polarity, the counter 110 is reset, and the counter 110 is incremented 530 one count.

When the counter 110 has not counted 535 to a predetermined number, the receipt of a next pulse is awaited from the input 102. However, when the counter 110 has counted 535 to the predetermined number, a further determination is made whether the earlier stored 520 new polarity, is substantially similar 540 to a predetermined polarity. When the new polarity is substantially similar 540 to the predetermined polarity, the counter 110 is reset 550 and provides an output to the polarity switch 120 such that the input pulse is routed from the input 102 to the output 135, and the receipt 505 of a next pulse is awaited. However, when the new polarity is not substantially similar 540 to the predetermined polarity, the counter 110 provides an output to the polarity switch 120, causing the input pulse, such as in input waveform 200 or 300 to be routed from the input 102 to the inverter 125 where the polarity of the input signal is inverted, and provided to the output 135. The output 135, may for example, produce the output waveform 400 having a negative polarity. It is should be understood that the output waveform may also have a positive polarity using the apparatus described herein.

Figure 6:
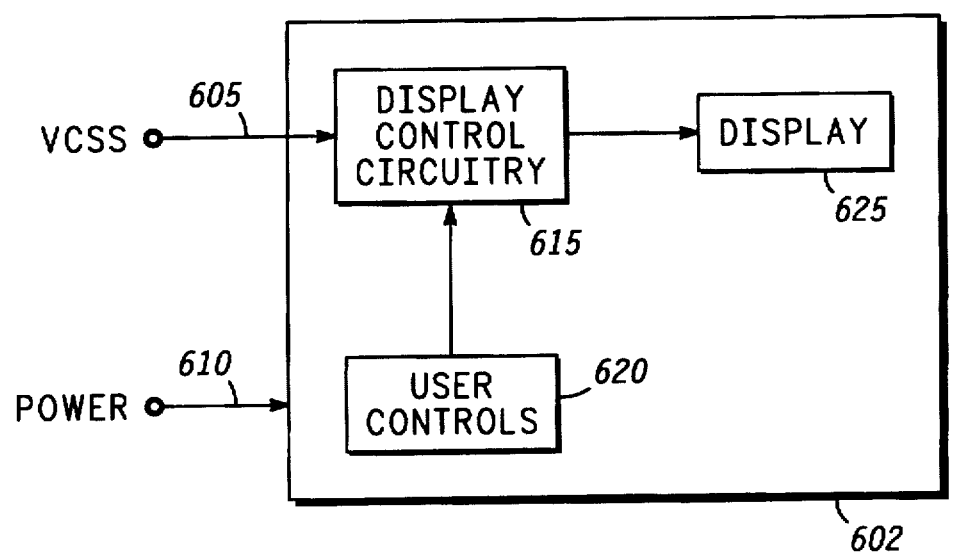
FIG. 6 illustrates a video monitor utilising the circuit in FIG. 1 in accordance with the preferred embodiment of the present invention.

FIG. 6 illustrates a video monitor 602 comprising display control circuitry 615, which is provided with a video composite synchronising signal (VCSS) via input 605. The VCSS may be provided by various equipment such as a computer or a television tuner, and as a result, the polarity of the VCSS may vary. The video monitor also comprises user controls 620 and display 625. The video monitor 602 is also provided with power via input 610 which powers the video monitor including the display control circuitry 615, the user controls 620 and the display 625. In addition to the VCSS from input 605, the display control circuitry 615 also receives input from the user control 620 and provides output to the display 625. Input from the user controls 620 may be used to affect changes to various characteristics of the display 625. A user can, for example, change the brightness and the contrast of the display using the user controls 620.

When a VCSS is received via input 605, the display control circuitry 615 determines whether the polarity of the VCSS is a predetermined polarity. When the polarity of the VCSS is the predetermined polarity, no changes are made to the VCSS, however, when the polarity of the VCSS is not the predetermined polarity, the display control circuitry 615 changes the polarity of the VCSS to become substantially similar to the predetermined polarity. For example, when the predetermined polarity is negative and the polarity of the VCSS received via input 605 is positive, an inverter may be used to invert the VCSS thereby changing the polarity of the VCSS from positive to negative. Hence, irrespective of the polarity of a VCSS provided to the display control circuitry 615 via the input 605, the display control circuitry 615 ensures that a VCSS of a predetermined polarity is provided, thereby ensuring the video monitor is able to provide an intelligible display.

In accordance with the present invention, an output sequence of synchronising pulses having a predetermined polarity may be provided by digitally determining the polarity of a predetermined number of valid pulses of an input stream of synchronising pulses, and subsequently utilising the polarity so determined, to select an appropriate process which modifies the polarity of the input stream of pulses to become substantially similar to the predetermined polarity This is achieved by extensive use of digital logic circuits to determine the polarity of a predetermined number of valid pulses, thereby realising numerous advantages over methods employing analogue circuits. The advantages include lower power requirement and consistent circuit performance under varying operational conditions. In addition, as this method utilises digital circuitry, it may be advantageously integrated with other digital control circuitry into a single component package. In this way, the function of providing a sequence of synchronising pulse of a predetermined polarity and existing digital control functionality may be integrated into a single semiconductor chip. In addition, such a semiconductor chip advantageously reduces the complexity of manufacturing a video monitor and hence, reduces the manufacturing time, and increases reliability. Further, this invention produces a video monitor that is compatible with a variety of equipment, hence, substantially simplifying the installation of the video monitor.

Hence, this invention enables user friendly installation of a video monitor utilising digital circuits that provide a video composite synchronising signal (VCSS) of a predetermined polarity to the video monitor and reduces the complexity and the time for manufacturing a video monitor, and increases the reliability.

What is claimed is:

1. An apparatus for providing a video composite synchronising signal (VCSS) of a predetermined polarity, wherein the VCSS comprises a sequence of pulses each having the predetermined polarity, the apparatus comprising:

a polarity detector coupled to receive an input VCSS comprising an input sequence of pulses and the polarity detector adapted to provide an output signal for indicating that the polarity of sequential pulses of the input sequence of pulses are substantially similar, wherein each of the input sequence of pulses has at least a first or a second polarity;

a validator coupled to receive the input sequence of pulses and adapted to provide an output sequence of pulses corresponding to the input sequence of pulses for indicating the validity of the input sequence of pulses;

a counter adapted to receive the output signal of the polarity detector and the output sequence of pulses from the validator for providing an output signal indicating the polarity of the input sequence of pulses in response to counting a predetermined number of pulses of the output sequence of pulses from the validator when the output signal of the polarity detector indicates that the polarity of the predetermined number of the corresponding input sequence of pulses are substantially similar;

an inverter having an input and an output; and a polarity switch coupled to receive the input sequence of pulses and the output signal of the polarity detector, for coupling the input sequence of pulses to the output of the inverter in response to the output signal of the polarity detector indicating the first polarity of the input sequence of pulses, and for coupling the input sequence of pulses to the input of the inverter in response to the output signal of the polarity detector indicating the second polarity of the input sequence of pulses.

2. The apparatus in claim 1 wherein the polarity detector, the validator, the counter, the inverter and the polarity switch comprise a digital electronic circuit.

3. A digital circuit for providing a video composite synchronising signal (VCSS) of a predetermined polarity, wherein the VCSS comprises a sequence of pulses each having the predetermined polarity, the circuit comprising:

a validator coupled to receive an input VCSS comprising an input sequence of pulses and the validator adapted to provide a corresponding output sequence of pulses, and for validating each of the input sequence of pulses, wherein the input sequence of pulses has a first or a second polarity;

a polarity detector coupled to receive the input sequence of pulses and the polarity detector adapted to provide an output signal for indicating that the polarity of sequential pulses of the input sequence of pulses are substantially similar;

a counter coupled to the validator and the polarity detector, and adapted to provide an output signal for indicating the polarity of a predetermined number of pulses of the input sequence of pulses in response to counting the predetermined number of corresponding pulses of the output sequence of pulses from the validator when the output signal of the polarity detector indicates that the polarity of each of the predetermined number of pulses of the input sequence of pulses is substantially similar;

an inverter having an input and an output; and a polarity switch coupled to receive the input sequence of pulses and coupled to the counter for coupling the input sequence of pulses to the output of the inverter in response to the output signal of the counter indicating the first polarity of the input sequence of pulses thereby providing the output sequence of pulses of the predetermined polarity, and for coupling the input sequence of pulses to the input of the inverter in response to the output signal of the counter indicating the second polarity of the input sequence of pulses thereby inverting the polarity of the input sequence of pulses to the first polarity and providing the output sequence of pulses having the predetermined polarity.

4. A method for providing a video composite synchronising signal (VCSS) of a predetermined polarity, wherein the VCSS comprises a sequence of pulses each having the predetermined polarity, the method comprising the steps of:

a) receiving an input VCSS comprising an input sequence of pulses, wherein each pulse of the input sequence of pulses has a first or a second polarity;

b) determining the duration when each of a predetermined number of the input sequence of pulses is the first polarity;

c) determining the duration between each of the predetermined number pulses of the input sequence of pulses;

d) determining the predetermined number of pulses are the first polarity when the duration each pulse of the predetermined number of pulses is the first polarity is greater than the duration between the pulses of the predetermined number of pulses; and e) determining the predetermined number of pulses are the second polarity when the duration between the pulses of the predetermined number of pulses is greater than the duration when each pulse of the predetermined number of pulses is the first polarity;

e) providing the input sequence of pulses to an output in response to determining the pulses of the predetermined number of pulses are the first polarity, and modifying the polarity of the input sequence of pulses to become the first polarity prior to providing the input sequence of pulses to the output in response to determining the pulses of the predetermined number of pulses are the second polarity.

5. The method of claim 4 wherein the step after step (b) comprises the step of: p1 determining that said each pulse is valid when the duration said each pulse is the first polarity is greater than a predetermined duration.

6. The method of claim 4, wherein modifying the polarity of the input sequence of pulses to become the first polarity in step (e) comprises the step of inverting the polarity of each pulse of the input sequence of pulses.

* * * * *